Fig. 3

| MIN. | SEC. | PROCESS STEP | Valve 23 | Valves 22 | Valves 44 & 46 | Solenoid 32 | Valve 28 | Valve 39 | Valve 34 | Switch 35 | Switch 60 | Switch 61 | Switch 62 | Switch 63 |
|---|---|---|---|---|---|---|---|---|---|---|---|---|---|---|
|  | * | 1. PUSH START BUTTON | X |  |  |  |  |  |  |  |  |  |  |  |
|  | 2 | 2. TAKE SAMPLE |  | X |  |  |  |  |  |  |  |  |  |  |
|  | 10 | 3. RETRACT SAMPLER |  |  | X |  |  |  |  |  |  |  |  |  |
|  | 1 | 4. TARE WEIGH CELL |  |  |  |  |  |  |  | X |  |  |  |  |
|  | 30 | 5. DUMP HOPPER, FLUSH |  |  |  | X | X |  |  | X |  |  |  |  |
|  | 10 | 6. WAIT |  |  |  |  | X |  |  |  |  |  |  |  |
|  |  | 7. DISSOLVE SAMPLE |  |  |  |  |  | X | X |  | X |  |  |  |
| 2 |  | 8. DIVERT FLOW, INTEGRATE |  |  |  |  |  |  | X |  | X | X |  |  |
| 2 |  | 9. RESET |  |  |  |  |  |  |  |  |  | X | X |  |
|  | 5 | 10. DRAIN TANK, TOTALIZE |  |  |  |  |  |  |  |  |  |  |  | X |

COMPONENTS ACTUATED

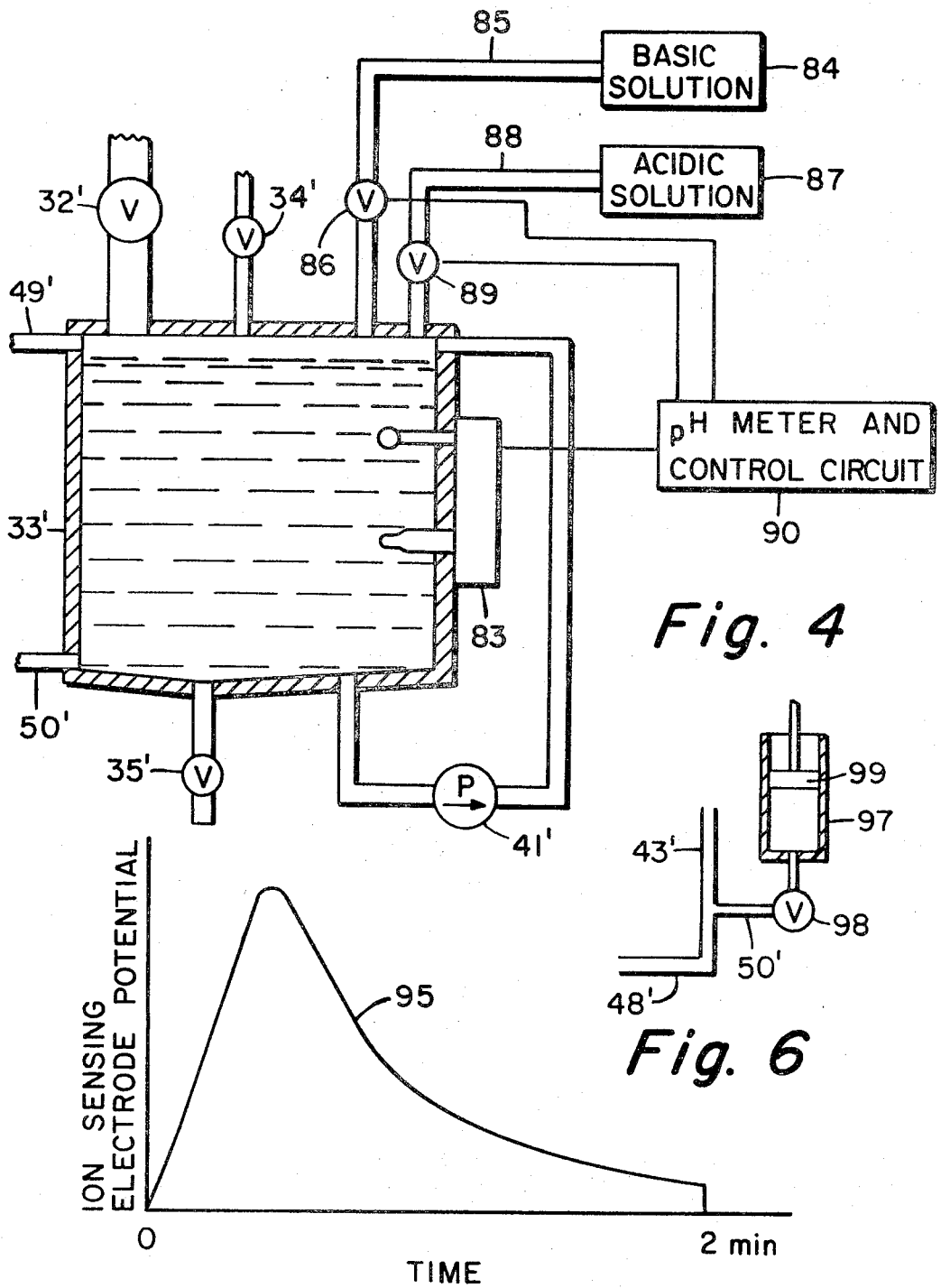

United States Patent Office 3,764,506
Patented Oct. 9, 1973

3,764,506
APPARATUS FOR DETERMINING CONCENTRATION OF AN ELEMENT IN A SAMPLE
David M. H. Platt, Harrodsburg, Ky., assignor to Corning Glass Works, Corning, N.Y.
Continuation-in-part of application Ser. No. 29,433, Apr. 17, 1970. This application Oct. 26, 1971, Ser. No. 192,360
Int. Cl. G01n 27/26
U.S. Cl. 204—195 R                                  15 Claims

ABSTRACT OF THE DISCLOSURE

Disclosed is an apparatus for automatically determining the weight or concentration of a compound or element in a solution. A sensing chamber containing at least one ion sensing electrode is provided with a continuous flow of carrier fluid. The solution is mixed with the carrier fluid and the resultant mixture flows to the sensing chamber. The electrical output of the ion sensing electrode continuously indicates the concentration of a specific ion in the liquid mixture reaching the chamber. After the electrical output of the electrode begins to increase, this output is integrated for a predetermined period of time while the mixture flows through the sensing chamber.

CROSS-REFERENCE TO RELATED APPLICATIONS

This application is a continuation-in-part of application Ser. No. 29,433 filed Apr. 17, 1970 and now abandoned.

BACKGROUND OF THE INVENTION

This invention relates to an apparatus for automatically determining the weight or concentration of a compound or element in a mixture of granular solids.

Although the preferred embodiment of this invention relates to the determination of the concentration of specific compounds or elements present in a batch of raw materials that is to be fed to a glass furnace or tank, it is also useful for analyzing other granular mixtures such as cement batch, refractory batch, smelter burden, digester feed and the like, and for analyzing solution.

Raw materials from silos, bins and other containers are combined and mixed prior to being fed to a glass furnace. Evaluations of batch house operations have been made in order to improve batch homogeneity, to maintain batch compositions and to optimize designs for new batch plants. The evaluation and optimization of batch systems is not a guarantee that batch of the proper composition will be delivered to the tank at all times. Problems such as sand in a soda ash silo or defective scales can still occur and often are not noticed until the tank has been filled with off-composition glass. It is therefore desirable to quickly and reliably analyze batch composition so that batch composition can be accurately controlled and off-composition glass can be prevented.

Heretofore, the analysis of granular solid material for content of specific compounds has been done by traditional wet chemical methods which are time consuming and require trained manpower. Moreover, samples usually must be carried to a central lab for testing. There is therefore a need for an automatically controlled apparatus operable with unskilled labor which will provide an acceptably accurate analysis of a sample of glass batch or other granular mixture for such uses as process analysis, error detection and computer controlled processes.

SUMMARY OF THE INVENTION

It is therefore an object of the present invention to provide an apparatus for quickly and accurately determining the weight or concentration of a compound or element in a mixture of granular solids or in a solution.

Another object of this invention is to provide an apparatus for continuously monitoring the composition of raw materials.

Briefly, the apparatus of this invention comprises means for retaining a sample of a solution containing an element, the concentration of which is to be determined. A chamber containing at least one ion sensing electrode is connected to means for supplying a stream of carrier fluid. Means are provided for mixing the solution with the carrier fluid so that the resultant mixture is conveyed to the chamber, the electrical output of the ion sensing electrode continuously indicating the concentration of a specific ion in the liquid mixture reaching the chamber.

BRIEF DESCRIPTION OF THE DRAWINGS

FIG. 3 is a chart indicating the components actuated during each step in the process performed by the apparatus of the present invention.

FIG. 4 is a modification of a portion of the apparatus of FIG. 1 which permits the use of an acidic solution for dissolving the sample of granular material.

FIG. 5 is a graph illustrating an X–Y recorder plot of the electrical output of an ion sensing electrode in response to a pulse of solution supplied to the sensing chamber.

FIG. 6 is a modification of a portion of the apparatus of FIG. 1 which permits the injection of a solution into a stream of carrier fluid.

DETAILED DESCRIPTION

Figure 1:
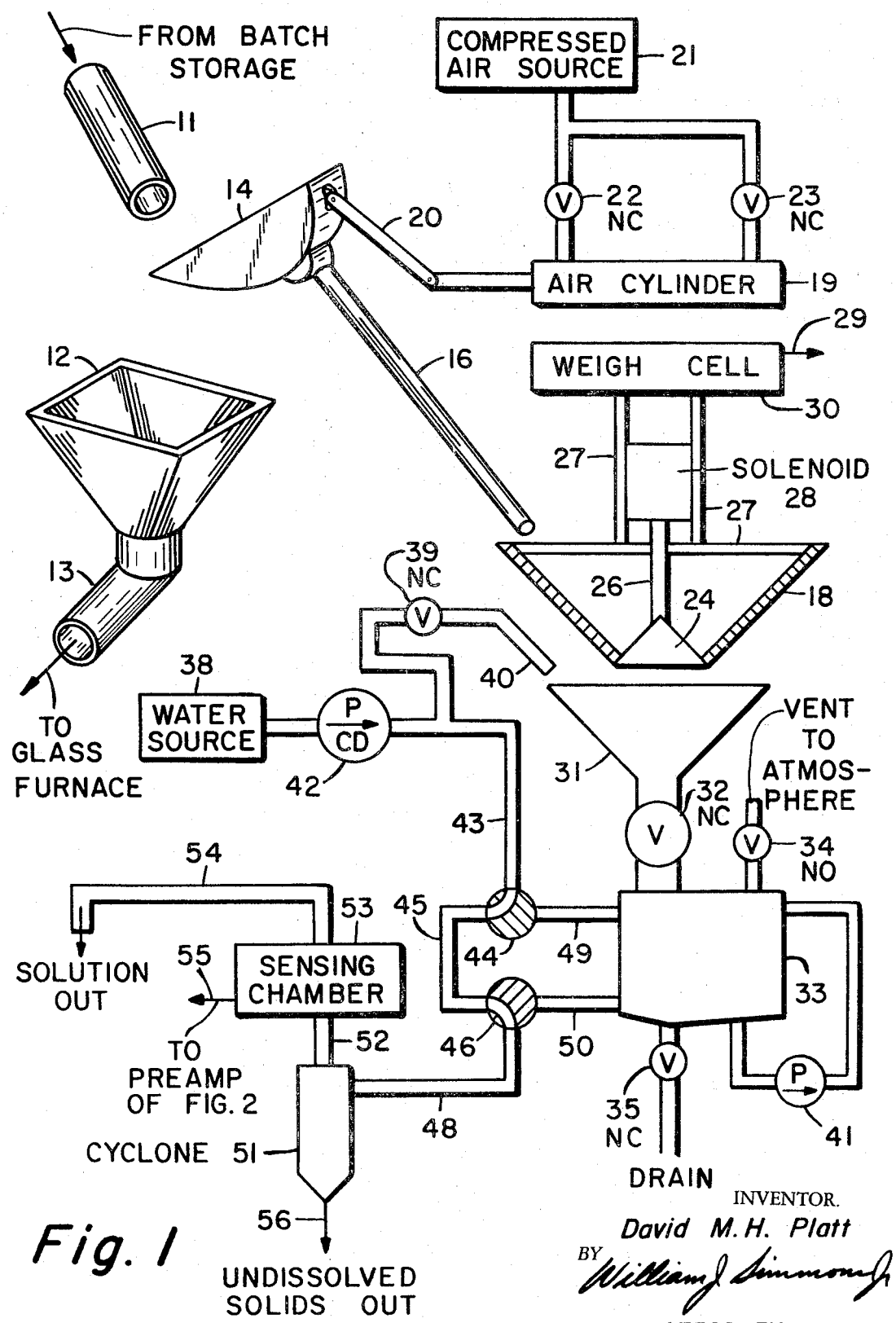
FIG. 1 is a schematic diagram of an apparatus constructed in accordance with the present invention.

This invention will be described in connection with a batch supplying and monitoring system for a glass manufacturing operation. It is to be understood that this invention is equally applicable to the analysis of solutions and other types of raw materials. Referring to FIG. 1, batch material flows from a pipe 11 and falls into a hopper 12 which is connected by a pipe 13 to a glass furnace or other utilization or storage device. A movable hopper 14 is connected by way of a movable joint to a pipe 16 which empties into a weigh hopper 18. The position of the movable hopper 14 is controlled by an air cylinder 19 which is connected thereto by an arm 20. A compressed air source 21 is connected by valves 22 and 23 to opposite ends of the air cylinder. Note that the numerals 22 and 23, as well as other numerals in FIG. 1 which designate valves, have the letters NC or NO located adjacent thereto. The letters NC indicate that that valve is normally closed, and the letters NO indicate that the valve is normally open. Thus, the valves 22 and 23 remain closed until they are opened by an electrical signal from a process timer to be hereinafter described. For the sake of simplicity and clarity, no process timer has been shown in the drawings and no lead lines are connected to the valves, all of which are electrically actuated. When the valve 23 is opened the arm 20 is forced from the air cylinder, thus moving hopper 14 into the batch intercepting position shown in FIG. 1. The arm 20 is retracted into the air cylinder when the valve 22 is opened, thereby pulling hopper 14 away from the batch emanating orifice of pipe 11. When hopper 14 is in this latter described position, batch emanating from pipe 11 is intercepted by hopper 12 and delivered to the glass furnace.

When hopper 14 is retracted away from pipe 11, the batch that had been intercepted thereby empties through pipe 16 into weigh hopper 18 which is suspended from weigh cell 30 by support members 27. At this time a cone 24 which is connected by the shaft 26 to a solenoid 28 is maintained in the position shown by the spring bias of the solenoid. The batch received by the weigh hopper 18 is retained therein by cone 24 and the electrical output 29 of weigh cell 30 is indicative of the weight of the batch. The batch from hopper 18 is dumped into a funnel 31 when the solenoid 28 is energized. The batch received by the funnel 31 passes through valve 32 into dissolving means such as a tank 33, the valve 32 being open when the weigh hopper is dumped. In the preferred embodiment hoppers 14 and 18, pipe 16, solenoid 28, cone 24, funnel 31 and valve 32 function as means for supplying a sample of granular solids to tank 33. This function could be slightly modified by manually supplying a sample to weight hopper 18 or by manually weighing a sample and supplying it directly to tank 33.

The tank 33 is normally vented to the atmosphere by a valve 34, and the contents of the tank can be drained through valve 35.

Means must be provided for supplying a solvent to tank 33 to dissolve the granular material which has been dumped therein. Depending upon the material to be dissolved, the solvent may be water, an organic compound, acidic or basic solutions or the like. In the embodiment shown in FIG. 1 the solvent is water supplied by a source 38 and a constant flow pump 42. This water flows through a valve 39 and nozzle 40 to dislodge any material adhering to the walls of funnel 31. A pump 41 recirculates and stirs the contents of tank 33 to form a solution containing those elements the concentrations of which are to be determined. Other stirring means may be employed such as a paddle wheel located in tank 33. A carrier fluid must be provided for mixing with the solution in tank 33 and for conveying the resultant mixture of solution and carrier fluid to a sensing chamber 53. To provide this function, water flows from pump 42 through pipe 43, valve 44 and 46 are actuated, the water flows from the valve 44 through the pipe 49, tank 33, pipe 50 and valve 46 to the pipe 48, and the carrier fluid is therefore diverted through tank 33. Pipe 48 is connected to cyclone 51 where undissolved solids are removed from the solution and exit from drain 56, the solution continuing through pipe 52 to sensing chamber 53 which contains ion sensing and reference electrodes. Sensing chamber 53 may be of the type disclosed in application Ser. No. 29,467 entitled "Flow-Through Chamber for Analysis of Continuously Flowing Sample Solution," filed Apr. 17, 1970. The solution flows from the sensing chamber through pipe 54 to a drain. No lead has been shown for connecting the reference electrode potential from the sensing chamber to the electrical circuitry associated with this invention since such a connection may be made in a conventional manner. The reference electrode could also be connected to a voltage feedback circuit as disclosed in U.S. Pat. No. 3,649,504 entitled "System for Controlling the Electrical Field in a Fluid Analyzing Chamber."

Figure 2:
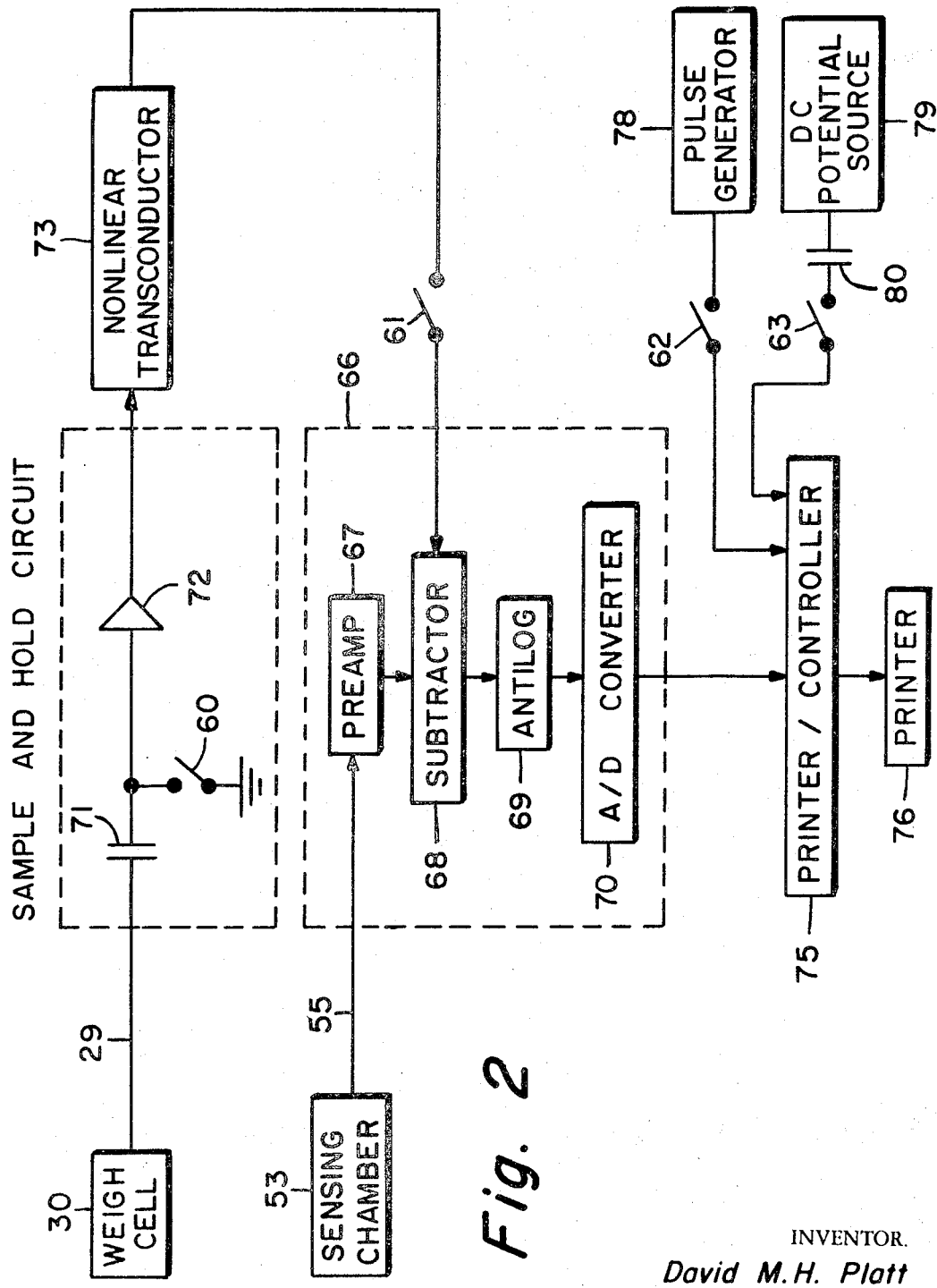
FIG. 2 is a schematic circuit diagram in block diagram form of an electronic circuit for processing electrical signals generated by components in FIG. 1.

FIG. 2 is a schematic circuit diagram of an electronic circuit which may be used to process the electrical signals developed by portions of the apparatus shown in FIG. 1. The overall function of this circuit is to process the electrical signals provided by the weigh cell 30 and an ion sensing electrode in chamber 53 in such a manner that a resultant electrical signal is produced which is proportional to the concentration of a specific element detected by the ion sensing electrode divided by the weight of the sample. The circuit then integrates this resultant electrical signal for a given time to provide an output indicative of the percentage of a given type of soluble ions present in the granular material being analyzed. Switches 60-63 are controlled by a process timer which also controls all of the valves shown in FIG. 1. Valves 22, 23, 32, 34, 35, 39, 44 and 46 and solenoid 28 of FIG. 1 are electrically controlled by switches on the process timer. The voltage appearing on one of the ion sensing electrodes in sensing chamber 53 is connected by a line 55 to an electrometer 66 which may include a preamplifier 67, subtracter circuit 68, antilog converter 69 and an analog-to-digital converter 70. The electrical output of the weigh cell of FIG. 1 is connected by a line 29, capacitor 71, high input impedance amplifier 72, non-linear transconductor 73 and switch 61 to the subtracter circuit 68.

The circuit including capacitor 71, amplifier 72 and switch 60, which is sometimes referred to as a "sample and hold circuit," is required for automatically referencing the weighing system to zero since the weight of the empty weigh hopper 18 plus the solenoid 28 represents a non-zero condition. When the weigh hopper 18 is filled with sample material, the contact 60 is closed, shorting the input of the amplifier 72 to ground and establishing a zero condition. The contact 60 is then opened and the weigh hopper is dumped so that the voltage coupled to the input of the amplifier 72 represents the weight of the sample which has just been dumped into funnel 31. The output of the non-linear transconductor 73 is the logarithm of the voltage appearing at the input of the amplifier 72.

The digital output of the analog-to-digital converter 70 is coupled to a printer-controller 75, the output of which is connected to printer 76. A pulse generator 78 is connected by switch 62 to the printer-controller, and a DC potential source 79 is connected through capacitor 80 and switch 63 to the printer-controller.

The operation of FIGS. 1 and 2 will now be discussed, reference being made to the process timer diagram shown in FIG. 3. This description will relate to the analysis of glass batch for soluble sodium since sodium oxide is an important constituent in many glasses and sodium specific ion electrodes are readily available. It will be obvious that the described apparatus can be extended or modified to detect any component for which there is a specific ion electrode and which can be readily dissolved. The pump 42 maintains a constant flow of water through the apparatus including cyclone 51 and sensing chamber 53, the dissolving tank 33 being bypassed since valves 44 and 46 are in the positions shown in FIG. 1. A 5 g.p.m. flow of water has been found to be satisfactory. The process timer (not shown) is actuated by pushing a start button. Valve 23 is actuated for two seconds, causing movable hopper 14 to intercept a sample of batch emanating from pipe 11. In one embodiment about 100 g. of glass batch was intercepted by hopper 14. Valve 22 is then opened for ten seconds and hopper 14 is retracted away from pipe 11, the contents thereof being dumped into weigh hopper 18. During the fourth step, the tank inlet valve 32 is opened and the switch 60 is closed, thereby shorting tare capacitor 71 to ground. During the fifth step, valve 32 remains opened, weigh hopper solenoid 28 is actuated, dumping the contents of hopper 18 into funnel 31, valve 39 is opened, and water from nozzle 40 flushes the sample from the funnel 31 into tank 33. The dissolving tank may be lined with silicone rubber and may have a capacity of approximately two liters. Step 5 continues for thirty seconds so that a sufficient amount of water is delivered to the tank to dissolve the sample. Since the flow from nozzle 40 is substantially constant, the amount of water delivered to tank 33 can be regulated by the period of time during which valve 39 remains open. About 1.5 liters of water was delivered to the tank in thirty seconds, an amount which caused the level of the resultant solution to raise to near the top of the tank. During step 6, after solenoid 28 has become deenergized and valve 39 has closed, tank inlet valve 32 remains open for ten seconds while water from funnel 31 drains into tank 33. During step 7, which lasts two minutes, the vent valve 34 is closed and switch 61 of FIG. 2 is closed. During this step, the recirculation action of pump 41 helps to dissolve the sample. During the eighth step, four of the contacts of the process timer are simultaneously closed for two minutes.

The diverter valves 44 and 46 are switched so that water from pump 42 is diverted through tank 33. The vent valve 44 and the switch 61 remain closed during this step. Switch 62 is also closed during step 8. The voltage on line 55, which is developed by a sodium ion sensing electrode in sensing chamber 53 is proportional to the logarithm of the sodium ion concentration. As stated previously, the output from non-linear transconductor 73 is the logarithm of the sample weight. When switch 61 is closed, the voltage representing the logarithm of the sample weight is subtracted from that representing the logarithm of the ion concentration and the resultant electrical output from subtracter circuit 68 is proportional to the logarithm of concentration divided by weight. The subtracter output voltage is coupled to antilog circuit 69 which provides a voltage proportional to concentration divided by weight. The analog-to-digital converter 70 converts this voltage to a digital signal representative of concentration divided by weight. During the time that switch 62 is closed, pulse generator 78 provides the printer-controller with a pulse every two seconds which causes the digital output of converter 70 to be transmitted to printer 76 and accumulated every two seconds for the duration of the integrate step which in this example is two minutes.

At the beginning of the reset step, diverter valves 44 and 46 return to the position shown in FIG. 1 and switch 62 opens so that no further outputs from converter 70 are accumulated. During this step vent valve 34 and switch 61 remain closed. This step provides a buffer time period before the totalizing step is performed and prevents errors from occurring due to transient conditions.

During the tenth and final step the drain valve 35 is opened and tank 33 is permitted to drain. Although it has not been illustrated in the drawings, a source of water or other suitable liquid could be connected to tank 33 during a portion of this step to rinse any residue therefrom. It is to be noted that the tank need not drain completely between successive samplings. In one successful operation of the disclosed apparatus, the tank drained only about 80% before being refilled. During the tenth step, switch 63 closes and connects DC potential source 79 to printer-controller 75 through capacitor 80. The effect of this capacitor is to cause an electrical pulse to be delivered to the printer-controller to initiate the totalize function. After this initial pulse, capacitor 80 blocks further flow of current.

The overall function of the system described hereinabove is to perform an integration of the concentration of ions in the stream of solution flowing through sensing chamber 53 divided by the sample weight. Although the integration function was terminated after a two-minute period in the example given, the accuracy of this method is practically unaffected since the concentration of the solution flowing through the sensing chamber after the elapse of two minutes is very low and its rate of change is low. If the flow of the carrier fluid-solution mixture past the ion sensing electrodes is substantially constant, the result of this integration is proportional to the percent of sodium ions in the sample. If the original sodium containing compound is known, this system could be calibrated to read numerical percent of that compound, e.g., $Na_2O$ or $Na_2CO_3$, as required.

The embodiment shown in FIG. 1 must be modified when the sample to be tested contains solids which are not soluble in water. One possible modification would be to merely connect the nozzle 40 with a source of the proper solvent. Another embodiment which may be used for dissolving samples, which are not soluble in water, is shown in FIG. 4 wherein components similar to those in FIG. 1 are indicated by primed reference numerals. Dissolving tank 33' is provided with a cell 83 from which pH sensing and reference electrodes extend into the interior of the tank. A basic solution source 84 is connected to tank 33' by a pipe 85 having a valve 86 therein, and an acidic solution source 87 is connected to tank 33' by a pipe 88 having a valve 89 therein. The electrical output from cell 83 is coupled to a pH meter and control circuit 90 which controls the operation of valves 86 and 89. Circuit 90 may be of the type disclosed in U.S. Pat. No. 2,726,670 entitled "Flow Control Apparatus," issued to J. J. J. Staunton on Dec. 13, 1955.

The tank 33' is initially filled with the sample and a predetermined amount of water by utilizing the apparatus of FIG. 1, then acid from source 87 is added until the pH of the solution is about 3. At this time circuit 90 responds to the voltage from cell 83 and closes valve 89. After the sample and the acidic solvent are mixed for a time sufficient to dissolve the sample, the valve 86 is opened and the basic solution from source 84 is added to the tank 33' until the solution is neutralized and the pH thereof is raised to about 7. Thereafter the process may resume at step 8 as described in conjunction with FIG. 3.

The embodiment shown in FIG. 4 may be used, for example, when determining the percentage of limestone (calcium carbonate) or magnesia (magnesium carbonate) in a batch. In either case HCl is added to the sample to form a solution, and after a sufficient time, the solution is neutralized with ammonium hydroxide. In practicing this invention other solvents may be used which may or may not require the use of neutralizing fluid. The few examples set forth herein are not to be considered as limiting the scope of this invention, but are exemplary of some of the many processes within the scope thereof.

FIG. 5 is a graph illustrating an X–Y recorder plot of the ion sensing electrode response to a pulse of solution washed from dissolving tank 33 to sensing chamber 53. Some of the solution from tank 33 mixes with water which was in pipe 48 prior to switching valves 44 and 46. This causes a gradual initial slope in curve 95 which is beneficial in that the specific ion electrode could not instantaneously follow an abrupt change from water to sample solution in sensing chamber 53. It is the area under curve 95 which provides a determination of the percentage of a given type of soluble ions in the sample mixture dissolved in tank 33 with an accuracy of ±1%. The method of the present invention provides more accurate results than would be obtained by placing the ion sensing electrode directly in the dissolving tank 33, since ion sensing electrodes are more stable in a continuously flowing stream, and since it is simpler to provide a substantially constant flow through the sensing chamber than to meter a fixed weight of water or other solvent to a dissolving tank as would be required if the sensing electrodes were in the dissolving tank.

In the heretofore described preferred embodiment the integration time was two minutes, and the integration process was initiated simultaneously with the switching of valves 44 and 46. If the volume of the pipework 48, 50 and 52, cyclone 51 and sensing chamber 53 were too great, the initiation of the integration process would have to be delayed since the mixture of the carrier fluid and the solvent from tank 33 would not have reached sensing chamber 53 for some appreciable time after integration had been initiated. Initiation of the integration period too soon before an electrical output is provided by the sensing chamber will introduce error in the output of the system. In those systems wherein a delay is experienced between the time that valves 44 and 46 are switched and an output signal is provided by chamber 53, the integration process should be delayed until the time that the sensing chamber provides an output. This time delay could be a predetermined time after valves 44 and 46 are switched or it could be determined by detecting the output of chamber 53 and using the detected signal to initiate integration.

Although the integration period was two minutes in the described embodiment, this period depends upon the physical parameters of the system. Integration time is affected by such parameters as flow rate of carrier fluid, volume of solution to be mixed with carrier fluid, volume of pipework and chambers between mixing point and sensing chamber, volume and physical configuration of sensing chamber, and the like. Integration time must be long enough that the entire peak shape is integrated (see FIG. 5), but it should not be so long that baseline changes encountered at long integration times could introduce noise into the results. The system can be calibrated and the optimum integration time period can be determined by running known concentrations of the detected element or compound through the system and observing that integration time which provides most accurate results.

Numerous modifications could be made to the described method without departing from the scope of this invention. For example, if the granular sample were manually weighed, as previously suggested, a predetermined weight could be dissolved in chamber 33 so that the output of the system would indicate the concentration of the measured element or compound. Obviously, the weigh cell 30 and the circuitry up to and including subtractor 66 would not be necessary to perform a method including manual weighing. A slight modification of this method would entail the adjustment of a potentiometer dial which could be calibrated in units of weight. The pointer would be set to the weight of the manually weighed sample the output voltage from the potentiometer could be connected to subtractor 68.

Although the preferred embodiment described the preparation of a solution from a solvent and a granular material, this step could be dispensed with if the element or compound under investigation were already in an existing solution. For example, the apparatus of FIG. 1 could be utilized to test river water, factory effluence or the like. Such solution could be directly injected into tank 33. If a known quantity of such solution were used, the concentration of elements contained therein could be determined. Circuitry similar to that of FIG. 4 could be used if an electrical level indicator in tank 33 provided a signal indicative of the quantity of solution in tank 33. This signal could be applied to transconductor 73 of FIG. 2. Otherwise the apparatus of FIGS. 1 and 2 could operate as previously described.

The carrier fluid need not be totally deflected through the tank 33; the process of this invention could be carried out by deflecting only a part of the carrier fluid. Thus valves 44 and 46 could be of the type that could be adjusted to cause some of the carrier fluid to flow through tank 33, the remainder flowing through pipe 45 and combining with the mixture flowing from tank 33 in valve 46. This method of operation would require a longer integration time for a given total flow through pipe 43, since a longer period of time would be required to generate peak shape of the curve of FIG. 5.

No carrier fluid need flow through the tank in which the solution is stored if the solution is injected into the stream of carrier fluid. As shown in FIG. 6, wherein elements similar to those of FIG. 1 are indicated by primed reference numerals, a solution stored in tank 97 is injected into a carrier stream flowing through pipes 43' and 48' by opening valve 98 and depressing plunger 99. The rate of mixing of carrier fluid and solution is determined by the rate at which the solution is injected into the carrier fluid. After the system is calibrated and the optimum integration time is determined, concentration of elements contained in the injected solution can be accurately determined. Tank 97 could be similar to dissolving tank 33 of FIG. 1, and compressed air could be applied to some inlet pipe such as pipe 49 to force the solution contained in the tank to emanate therefrom and be injected into a carrier stream.

I claim:

1. Apparatus for determining the concentration of an element in a solution comprising
   means for retaining a sample of said solution,
   a chamber containing at least one ion sensing electrode, said electrode being specifically sensitive to ions of said element,
   means for supplying said chamber with a stream of carrier fluid,
   means for mixing said solution with said carrier fluid and simultaneously conveying the resultant mixture to said chamber in such a manner that the concentration of said element in said mixture increases from a first minimum value to a maximum value and thereafter decreases to a second minimum value at which the rate of change of concentration with time is negligible, the period of time between the occurence of said first and second minimum values constituting a given period of time, the electrical output of said ion sensing electrode continuously indicating the concentration of a specific ion in the liquid mixture reaching said chamber during said given period of time, and
   means for integrating said electrical output from said electrode for said given period of time.

2. Apparatus in accordance with claim 1 wherein said means for mixing including valve means for diverting at least a portion of said carrier fluid through said sample retaining means and for flowing said mixture back into the path of said carrier stream whereby said mixture is conveyed to said chamber.

3. Apparatus in accordance with claim 1 wherein said means for mixing comprises means for injecting said solution into said carrier stream to form said mixture.

4. Apparatus in accordance with claim 1 further comprising means for removing undissolved solids from said mixture.

5. Apparatus in accordance with claim 1 further comprising
   means for supplying a weighed sample of granular solids to said sample retaining means,
   means for supplying a solvent to said sample retaining means, and,
   means for combining said granular solids and said solvent to form a solution.

6. Apparatus in accordance with claim 5 wherein said means for supplying a solvent comprises means for supplying an acidic solution to said sample retaining means, said apparatus further comprising means for supplying a basic solution to said sample retaining means, and means responsive to the pH of said solution for controlling the flow of said acidic and basic solutions.

7. Apparatus in accordance with claim 5 wherein said means for combining said sample and said solvent comprise a pipeline connected between the bottom and top of said sample retaining means and a pump in said pipeline.

8. Apparatus for determining the concentration of an element in a solution comprising
   means for retaining a sample solution,
   means for supplying a weighed sample including a weigh cell having a weigh hopper suspended therefrom for retaining a weighed sample of granular solids, said weigh cell providing an electrical signal indicative of the weight of said granular solids,
   means for dumping the contents of said weigh hopper into said sample retaining means,
   means for supplying a solvent to said sample retaining means,
   means for combining said granular solids and said solvent to form a solution,
   a chamber containing at least one ion sensing electrode,
   means for supplying said chamber with a stream of carrier fluid, and
   means for mixing said solution with said carrier fluid so that the resultant mixture is conveyed to said chamber, the electrical output of said ion sensing electrode continuously indicating the concentration of a specific ion in the liquid mixture reaching said chamber.

9. Apparatus in accordance with claim 8 wherein said means for supplying a weighed sample further comprises means for intercepting said sample from a source of granular solids and delivering said sample to said weigh hopper.

10. Apparatus for determining the concentration of an element in a solution comprising means for retaining a sample solution, a weigh cell having a weigh hopper suspended therefrom for retaining a weighed sample of granular solids, said weigh cell providing an electrical signal indicative of the weight of said granular solids, electrically controlled means for dumping the contents of said weigh hopper into said sample retaining means, means for supplying a solvent to said sample retaining means, means for combining said granular solids and said solvent to form a solution, a chamber containing at least one ion sensing electrode, means for supplying said chamber with a stream of carrier fluid, means for mixing said solution with said carrier fluid so that the resultant mixture is conveyed to said chamber, the electrical output of said ion sensing electrode continuously indicating the concentration of a specific ion in the liquid mixture reaching said chamber, and electronic circuit means connected to said ion sensing electrode and said weigh cell output for providing an output electrical signal proportional to the concentration of said element divided by the weight of said sample.

11. Apparatus in accordance with claim 10 further comprising sample and hold circuit means for providing an electrical signal proportional to the weight of sample dumped from said weigh hopper into said sample retaining means, non-linear means connected to said sample and hold circuit for providing an electrical signal proportional to the logarithm of the output of said sample and hold circuit, a subtracter circuit having one input connected to the output of said non-linear means, means connecting the electrical output signal from said ion sensing electrode to said subtracter circuit, said subtracter circuit providing an output voltage proportional to said ion sensing electrode output minus the output from said non-linear means, and antilog means connected to the output of said subtracter circuit for providing an electrical signal proportional to the concentration of said element divided by the weight of said sample.

12. Apparatus in accordance with claim 11 wherein means for integrating is connected to the output of said antilog means.

13. Apparatus in accordance with claim 11 further comprising an analog-to-digital converter connected to said antilog means, and means to periodically totalize the output of said converter.

14. Apparatus for determining the concentration of an element in a sample mixture of granular solids comprising dissolving means for retaining a sample containing solution, means for supplying a weighed sample of granular solids to said dissolving means, means for supplying a solvent to said dissolving means, means for combining said sample and said solvent to form a solution, a chamber containing at least one ion sensing electrode, means for supplying said chamber with a stream of carrier fluid, and valve means for diverting said carrier fluid through said dissolving means whereby said solution is mixed with said carrier fluid and the resultant mixture is conveyed to said chamber, the electrical output of said ion sensing electrode continuously indicating the concentration of a specific ion in the liquid mixture reaching said chamber.

15. Apparatus in accordance with claim 14 further comprising means for integrating said electrical output from said electrode for a given period of time.

References Cited

UNITED STATES PATENTS

| | | | |
|---|---|---|---|
| 3,654,113 | 4/1972 | Bochinski | 204—1 T |
| 3,210,261 | 10/1965 | Tyler | 204—1 T |
| 3,208,926 | 9/1965 | Eckfeldt | 204—1 T |

JOHN H. MACK, Primary Examiner

W. I. SOLOMON, Assistant Examiner

U.S. Cl. X.R.

324—29, 71 R